US011199388B2

(12) United States Patent
McArthur et al.

(10) Patent No.: US 11,199,388 B2
(45) Date of Patent: Dec. 14, 2021

(54) PAYLOAD ACTIVATION DEVICE

(71) Applicant: BAE Systems plc, London (GB)

(72) Inventors: Gordon John Victor McArthur, Preston (GB); Aaron John Milburn, Preston (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 17/049,356

(22) PCT Filed: May 1, 2019

(86) PCT No.: PCT/GB2019/051209
§ 371 (c)(1),
(2) Date: Oct. 21, 2020

(87) PCT Pub. No.: WO2019/220076
PCT Pub. Date: Nov. 21, 2019

(65) Prior Publication Data
US 2021/0164764 A1    Jun. 3, 2021

(30) Foreign Application Priority Data

May 17, 2018 (EP) ..................................... 18172966
May 17, 2018 (GB) ..................................... 1808017

(51) Int. Cl.
*F42C 15/40* (2006.01)
*F41G 7/22* (2006.01)
(Continued)

(52) U.S. Cl.
CPC ............ *F42C 15/40* (2013.01); *F41G 7/2253* (2013.01); *F42B 15/10* (2013.01); *G06K 9/0063* (2013.01); *B64D 1/04* (2013.01)

(58) Field of Classification Search
CPC ........ F42C 15/40; F41G 7/2253; F42B 15/10; G06K 9/0063; B64D 1/04
(Continued)

(56) References Cited

U.S. PATENT DOCUMENTS 3,625,106 A    12/1971 Russo et al.
3,713,387 A    1/1973 Karp
(Continued)

FOREIGN PATENT DOCUMENTS

FR    2919269 A1    1/2009
GB    985229 A1    3/1965
(Continued)

OTHER PUBLICATIONS

International Search Report and Written Opinion for PCT Patent Appl. No. PCT/GB2019/051210, dated Jun. 4, 2019, 13 Pages.
(Continued)

*Primary Examiner* — Bret Hayes
(74) *Attorney, Agent, or Firm* — Maine Cernota & Rardin

(57) ABSTRACT

The present disclosure provides a payload activation device. The payload activation device comprises a camera having a fixed focal length, arranged to capture an image of an object on a platform for carrying a payload having the payload activation device, wherein, when the payload is in a first position relative to the platform, the image of the object is in a first focused state and, when the payload is in a second position relative to the platform, the image of the object is in a second focused state. The payload activation device also comprises a processor configured to determine whether the image of the object is in the first focused state or the second focused state and to cause actuation of an activation mechanism within the payload when the image of object is in the second focused state to activate the payload. The present disclosure also provides a deployable payload having the
(Continued)

payload activation device and an aircraft for carrying the deployable payload.

20 Claims, 5 Drawing Sheets

(51) Int. Cl.
*F42B 15/10* (2006.01)
*G06K 9/00* (2006.01)
*B64D 1/04* (2006.01)

(58) Field of Classification Search
USPC ........................................................ 102/206
See application file for complete search history.

(56) References Cited

U.S. PATENT DOCUMENTS

| | | | |
|---|---|---|---|
| 4,478,127 A | 10/1984 | Hennings | |
| 4,662,278 A | 5/1987 | Lillios | |
| 5,386,781 A | 2/1995 | Day | |
| 7,137,599 B1 * | 11/2006 | Sitzmann | B64D 7/08 244/137.4 |
| 8,371,535 B2 | 2/2013 | Grabmeier et al. | |
| 8,430,031 B1 | 4/2013 | Thorniley et al. | |
| 2008/0110364 A1 | 5/2008 | Richards et al. | |
| 2010/0070674 A1 * | 3/2010 | Campbell | B64D 7/08 710/315 |
| 2010/0282893 A1 | 11/2010 | Roemerman | |
| 2012/0150365 A1 * | 6/2012 | Maxwell | B64D 1/04 701/3 |
| 2012/0291613 A1 | 11/2012 | Rastegar | |
| 2017/0082408 A1 | 3/2017 | Thompson et al. | |

FOREIGN PATENT DOCUMENTS

| | | |
|---|---|---|
| GB | 1603227 A | 11/1981 |
| WO | 2006134370 A | 12/2006 |
| WO | 2010031377 A2 | 3/2010 |
| WO | 2012162381 A1 | 11/2012 |
| WO | 2015149108 A1 | 10/2015 |
| WO | 2018063076 A1 | 4/2018 |

OTHER PUBLICATIONS

Search Report for European Patent Appl. No. 18172968.2, dated Jul. 31, 2018, 8 Pages.
Search Report for Great Britain Appl. No. 1808008.5, dated Nov. 15, 2018, 4 Pages.
Search Report for European Patent Appl. No. 18172966.6, dated Oct. 10, 2018, 5 Pages.
Search Report for Great Britain Appl. No. 1808017.6, dated Nov. 19, 2018, 4 Pages.
International Search Report and Written Opinion for PCT Appl. No. PCT/GB2019/051209, dated Jul. 5, 2019, 11 Pages.
International Preliminary Report on Patentability for PCT Appl. No. PCT/GB2019/051209, dated Nov. 17, 2020, 7 Pages.
International Preliminary Report on Patentability for PCT Appl. No. PCT/GB2019/051210, dated Nov. 17, 2020, 9 Pages.

* cited by examiner

PAYLOAD ACTIVATION DEVICE

RELATED APPLICATIONS

This application is a national phase application filed under 35 USC § 371 of PCT Application No. PCT/GB2019/051209 with an International filing date of May 1, 2019, which claims priority of GB Patent Application 1808017.6 filed May 17, 2018 and EP Patent Application 18172966.6 filed May 17, 2018. Each of these applications is herein incorporated by reference in its entirety for all purposes.

FIELD OF THE INVENTION

This specification relates generally to payload activation devices and deployable payloads comprising a payload activation device. More specifically, the specification relates to payload activation devices for activating air-launched payloads.

BACKGROUND OF THE INVENTION

Military aircraft typically carry a number of deployable payloads on hardpoints inside a weapons bay, on wings, or under the fuselage. These payloads include but are not limited to air-to-air missiles, air-to-ground missiles, free-fall bombs, guided bombs, sonobuoys, mines, depth charges, torpedoes, drones and fuel tanks.

Payloads typically require activation after release. For example, to launch an air-to-air missile stored in a weapons bay, the weapons bay doors are opened, the missile is released to drop vertically into the airflow, and once it has dropped a predetermined distance from the fuselage the weapon's engine is ignited. In other words, the missile's engine is activated. Other forms of activation include engaging a guidance system or disengaging a safety arming and fusing mechanism (SAFU).

Currently, a lanyard mechanically couples the payload to the hardpoint. The lanyard is fixedly attached to the hardpoint. As the payload falls, the lanyard becomes taught. At a predetermined tension, the lanyard pulls away from the payload, in turn causing the payload to activate. The other end of the lanyard remains fixed to the hardpoint. The remaining lanyard could then become entangled in other payloads, increase the radar cross section of the aircraft or prevent the weapons bay doors from closing properly. The present invention seeks to address this problem.

SUMMARY OF THE INVENTION

According to a first aspect of the present invention, there is provided a payload activation device, comprising: a camera having a fixed focal length, arranged to capture an image of an object on a platform for carrying a payload having the payload activation device, wherein when the payload is in a first position relative to the platform the image of the object is in a first focused state and when the payload is in a second position relative to the platform the image of the object is in a second focused state; and a processor configured to determine whether the image of the object is in the first focused state or the second focused state and to cause actuation of an activation mechanism within the payload when the image of object is in the second focused state to activate the payload.

As such, the payload activation can be retrofitted to existing payloads and provide the prior art functionality while not leaving material behind on an aircraft after the payload is released.

The payload activation device may further comprise a servo for actuating the switch, the processor being configured to cause actuation of the servo to actuate the switch when the image of the object is in the second focused state.

Alternatively, the payload activation device may comprise a housing; a cord, disposed within the housing, arranged to be coupled at a first end to an activation mechanism within a payload; a retardation device coupled to the second end of the cord, wherein the processor is configured to release the retardation device from a retained position within or adjacent to the housing when the image of the object is in the second focused state, wherein when released, the retardation device is arranged to tauten the cord, and wherein at a first tension the cord is arranged to actuate the switch.

The cord may be a lanyard.

The retardation device may comprise a drogue.

The payload activation device may further comprise: an activation delay device configured to cause actuation of the switch a predetermined time after the image of the object enters the second focused state.

The activation delay device may be configured to release the retardation device by opening a door in the housing of the payload activation device.

In the first focused state the object may be in focus, and in the second focused state the object may be substantially out of focus. The object may comprise a plurality of spaced apart lines, and wherein in the first focused state individual lines are distinguishable by the processor and in the second focused state individual lines are not distinguishable by the processor.

According to a second aspect of the present invention, there is provided a deployable payload for an aircraft, the deployable payload comprising a payload activation device according to the first aspect, the deployable payload comprising an activation mechanism for activating the payload, wherein the activation mechanism is arranged to be actuated to activate the payload when the image of the object is in the second focused state.

The activation mechanism may be configured to release the cord when the cord is at a second predetermined tension between the first end and second end, the second tension being greater than the first tension. Alternatively, the cord may be configured to break when the cord is at a second predetermined tension between the first end and second end, the second tension being greater than the first tension.

The payload activation device may be coupled to the outside of the payload.

The deployable payload may further comprise an engine, wherein the activation mechanism is arranged to activate the engine when actuated. The deployable payload may further comprise a safety, arming and fusing unit for preventing a warhead from being armed, wherein the activation mechanism is configured to deactivate the safety, arming and fusing unit when actuated.

The deployable payload may be an air-launched weapon.

According to a third aspect of the present invention, there is provided an aircraft for carrying the deployable payload according to the second aspect, the aircraft comprising a plurality of spaced apart lines, wherein the camera is arranged to capture an image of the spaced apart lines when the deployable payload is carried.

According to a fourth aspect of the present invention, there is provided a method of deploying a payload from a platform, the platform comprising an object and the payload comprising a fixed focal length camera arranged to image the object, the method comprising: capturing an image of the object using the fixed focal length camera; determining whether the image is a first focused state or a second focused state, wherein when the payload is in a first position relative to the platform the image of the object is in the first focused state and when the payload is in a second position relative to the platform the image of the object is in the second focused state; and actuating an activation mechanism within the payload to activate the payload if the image of object is in the second focused state.

The method may comprise actuating a servo to actuate the switch when the image of the object is in the second focused state.

Alternatively, the method may comprise retaining a retardation device for actuating the activation mechanism within or adjacent to a housing when the image of the object is in the first focused state; and releasing the retardation device when the image of the object is in the second focused state, wherein the retardation device is coupled to the activation mechanism via a cord and, when released, the retardation device is arranged to tauten the cord, wherein at a predetermined tension the cord actuates the activation mechanism.

The method may comprise causing actuation of the activation mechanism a predetermined time after the image of the object enters the second focused state.

The method may comprise opening a door in the housing of the payload activation device to release the retardation device.

In the first focused state the object may be in focus, and in the second focused state the object may be substantially out of focus. The object may comprise a plurality of spaced apart lines, and wherein in the first focused state individual lines are distinguishable by the processor and in the second focused state individual lines are not distinguishable by the processor.

BRIEF DESCRIPTION OF THE DRAWINGS

Embodiments will now be described, by way of non-limiting example, with reference to the accompanying drawings, in which.

DETAILED DESCRIPTION

Embodiments herein relate generally to a payload activation device. The payload activation device can be retrofitted to existing payloads or can be formed as part of payloads as they are manufactured. In brief, a fixed focal length camera attached to the payload is used to determine when the payload has fallen a predetermined distance from the platform. Upon determining that the payload has fallen a predetermined distance, an activation mechanism within the payload is actuated to activate the payload.

In some embodiments, once the payload has fallen a safe distance from the platform, a retardation device pulls a lanyard from the payload into the airflow. Once a predetermined first tension in the lanyard has been reached, the payload is activated. Once a predetermined second tension in the lanyard has been reached, the lanyard severs from the payload. The safe distance is determined using the fixed focal length camera.

In other embodiments, once the payload has fallen a safe distance from the platform, a servo-driven actuator actuates an activation mechanism within the payload to activate the payload. The servo-driven actuator is controlled by a processor that processes images obtained from the fixed-focal length camera. Hereinbelow, the activation mechanism being "within the payload" is intended to cover at least part of the activation mechanism, such as a lug, being disposed on an outer casing of the payload.

Figure 1:
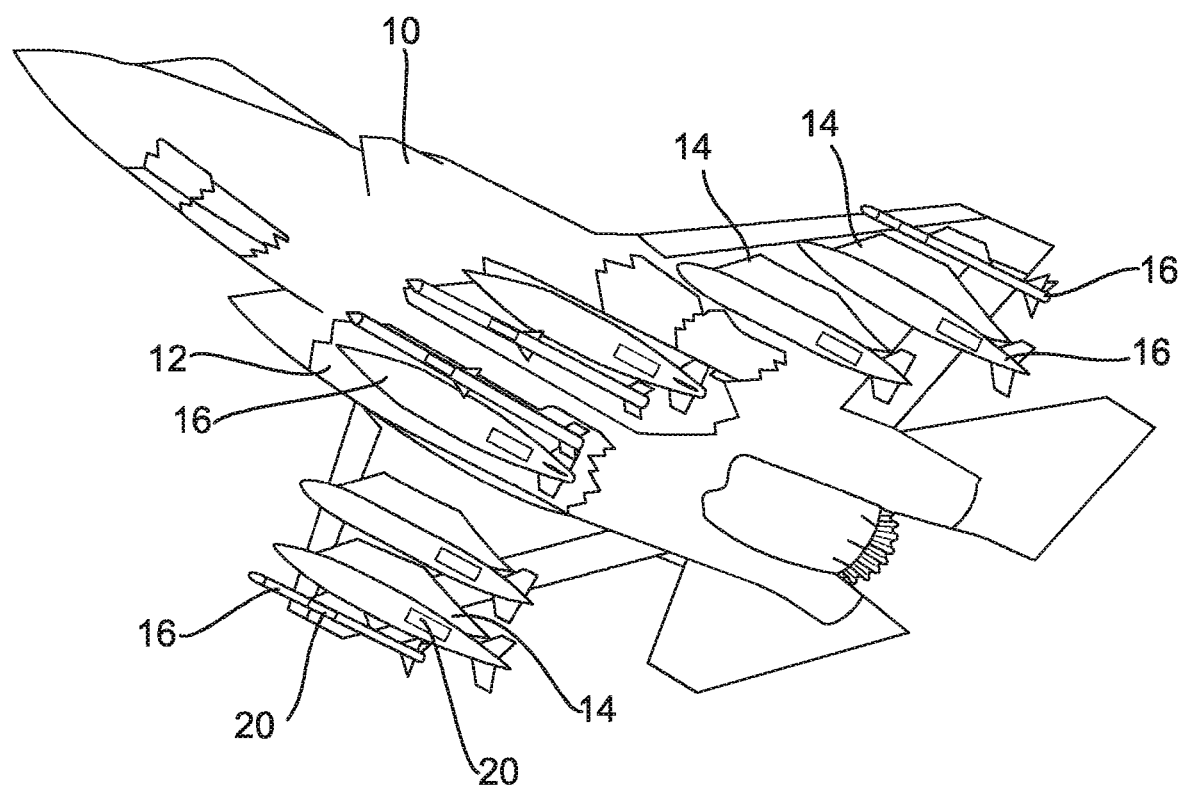
FIG. 1 is a perspective view of an aircraft having a plurality of payloads according to embodiments of the present invention.

FIG. 1 shows an aircraft 10 comprising a plurality of payloads 16. The aircraft shown is a manned fighter jet; however, it would be appreciated that the present invention could be applied to any aircraft, such as a helicopter, transport aircraft, bomber, unmanned drone or maritime patrol aircraft. Each payload 16 is attached to a hardpoint (or pylon) 14. The hardpoints 14 in the example shown in the Figure are beneath the wings of the aircraft and disposed within the aircraft's 10 weapons bays 12. In other embodiments, the hardpoints 14 may be beneath the fuselage of the aircraft 10, attached to the side of the aircraft 10 or over-wing. In the embodiment shown in FIG. 1, the aircraft 10 has two weapons bays 12; however, it would be appreciated that the aircraft 10 may have more or fewer weapons bays 12. Furthermore, weapons bays 12 typically have doors that are opened prior to a payload release. For clarity, the bay doors are not shown in FIG. 1.

The payloads 16 shown are air-launched weapons. For example, the payloads include free-fall bombs and air-to-air missiles. While some payloads 16 drop from the aircraft 10 before being activated, others use the hardpoint 14 as a launch rail. Some payloads can be configured to be released using either method.

Payloads 16, whether air-launched weapons, sensors, satellites or unmanned aircraft, typically require activation after being released. In some embodiments, activation comprises igniting a motor (where the payload 16 is not launched from the hardpoint 14 itself), for example a rocket motor or ramjet. In other embodiments, activation comprises activating a guidance or control system. Activating a control system may comprise extending or deploying a control surface, such as a tail fin. In other embodiments again, activation comprises deactivating a safety, arming and fusing unit such that a warhead can be armed at a future time.

Each payload 16 requiring activation after launch comprises a payload activation device 20. In some embodiments, as shown in FIG. 1, the payload activation device 20 is affixed to the payload 16 after the payload 16 has been manufactured. Here, the payload activation device 20 may be strapped, screwed, glued, clamped or otherwise affixed in any suitable manner to the payload 16. According to other embodiments, the payload activation device 20 is part of the payload 16.

The payload activation device 20 is configured to actuate an activation mechanism within the payload 16 once the payload 16 is a predetermined distance from the aircraft 10. The activation mechanism may be a mechanical switch, for example.

Figure 2:
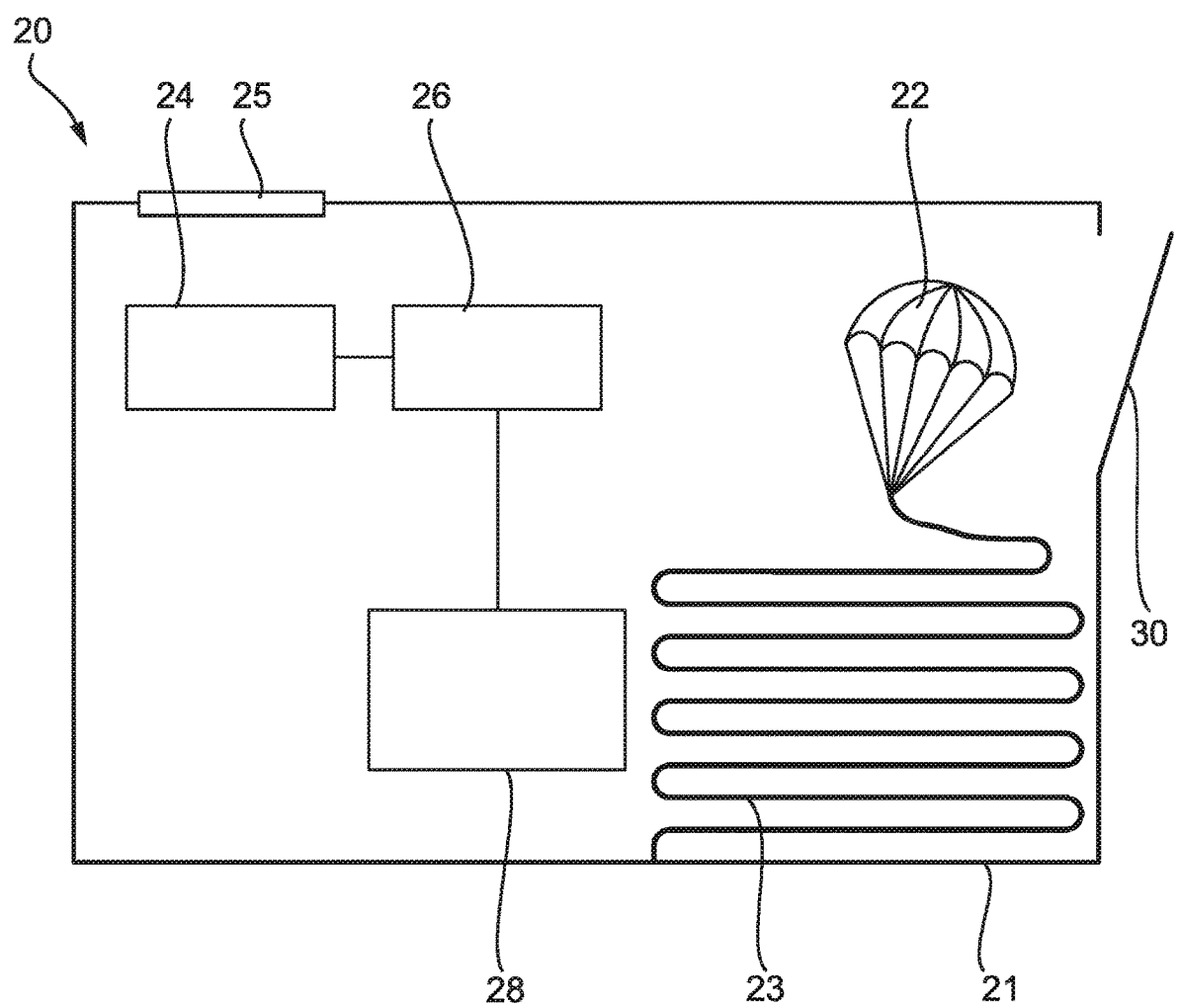
FIG. 2 is a system view of a payload activation device according to embodiments of the present invention.

The payload activation device 20 is shown in more detail in FIG. 2. In some embodiments, the payload activation device 20 includes a retardation device 22, a cord 23, a fixed focal length camera 24, a window 25, a processor 26, an activation delay device 28 (which may be a feature of the processor 26) and a retaining device 30.

The window 25 is arranged directly opposite an object to be imaged within a weapons bay 12 or affixed to the underside of a pylon 14. The object to be imaged is, for example, a barcode or QR code. The object to be imaged includes a plurality of separated elements, such as lines. The window 25 may be an opening in the housing 21, or may be made of a translucent material such as glass or plastic.

The fixed focal length camera 24 is arranged to capture images of the object through the window 25. The focal length of the camera 24 is set such that when the payload 16 is attached to the hardpoint 14 (i.e. when the payload 16 is closest to the hardpoint 14), the images of the object are in a first focused state. For example, when the payload is attached to the hardpoint 14, the image is in focus. When the payload 16 is released from the hardpoint 14, the fixed focal length camera 24 moves away from the object. At a predetermined distance from the object, the processor 26 determines that the image of the object has entered a second focused state. For example, at a predetermined distance from the hardpoint 14, the image of the object is substantially out of focus.

In other embodiments, the focal length of the camera 24 is set such that in the first focused state the image of the object is substantially out of focus and in the second focused state the image of the object is in focus.

To determine whether the image of the object is in the first focused state or the second focused state, the processor 26 is configured to count the number of distinguishable lines in an image of the object. If one line cannot be effectively distinguished from another, i.e. if the lines are blurred together, the image of the object is determined to be out of focus. If the lines are distinguishable from each other, at least to a predetermined degree, then the image of the object is determined to be in focus.

Alternatively, the processor 26 is configured to use edge detection software to determine whether the image of the object is in focus or out of focus. One example of such a method is to divide the image into subregions and measure the value of gradients between the subregions. Based on a threshold it can then be determined whether a particular subregion is in-focus or not. The edge information can then be reused to refine the first approximation. There are a growing number of such software techniques for detecting focus, and the present invention is not limited to the examples provided herein. In other words, the present invention relates to an improved method of releasing a payload from an aircraft which makes use of computer vision techniques, rather than to computer vision techniques per se.

When the processor 26 determines that the image of the object has entered the second focused state, or, in other words, the payload 16 has fallen a predetermined distance, the processor 26 releases the retardation device 22 into the airflow.

In other embodiments, the image of the object is used to determine that the payload has been released. When the processor 26 determines that the image of the object has entered the second focused state, the activation delay device 28 is activated. After a predetermined time, determined by the activation delay device 28, the retardation device 22 is released into the airflow. This tends to prevent the retardation device 22 from being released too early and getting caught in the aircraft 10 or its slipstream, or the payload 16 activating too close to the aircraft 10. The activation delay device 28 can be configured to prevent the retardation device 22 from being released at all, and therefore the payload 16 can be dropped without ever being activated.

It would be readily appreciated that alternative ways of achieving the latter advantage would be to lock the retaining device 30 in place or to remotely deactivate elements of the payload activation device 20 from the cockpit of the aircraft 10.

In other embodiments, not shown, the payload 16 is activated by a servo coupled to the activation mechanism of the payload 16 instead of a retardation device. Here, when the processor 26 determines that the image of the object has entered the second focused state, or, in other words, the payload 16 has fallen a predetermined distance, the processor 26 actuates the servo to actuate the activation mechanism. Coupling the servo to the activation mechanism of the payload 16 is just one means by which the payload activation device 20 can be provided as an aftermarket upgrade to existing payloads.

To prevent inadvertent activation of the payload 16 due to movement of the aircraft 10 in flight causing blurring of the captured images, the fixed focal length camera 24 has a very high frame rate, such as 2000 FPS. Additionally, the camera 24, or the payload activation device 20 as a whole, is mounted to the payload 16 using a mechanical damper. The processor 28 may also be provided with motion damping software.

In the embodiment shown in FIG. 2, the retardation device 22 is coupled to the cord 23. The other end of the cord 23 is, in use, coupled to an activation mechanism within the payload 16. The cord 23 may be tied or otherwise affixed to a lug on the activation mechanism. Arrangements of activation mechanisms for payloads and procedures that take place once they are actuated would be readily appreciated by the skilled person. The present invention relates to a device for actuating prior art activation mechanisms, rather an activation mechanism per se. For example, lugs and other fixings for cords (e.g. lanyards) would be readily considered by the skilled person.

The activation mechanism is for activating the payload 16 when the tension in the cord 23 reaches a predetermined threshold. The predetermined threshold is less than the force required to break the cord 23 or lug, or separate the cord 23 from the retardation device 22. In some embodiments, the cord 23 is a thin metal wire. However, it would be appreciated that this is not intended to be limiting, and any suitable lightweight elongate material with high tensile strength may be used, such as bungee cord. In some embodiments, the cord 23 is in the form of a lanyard (in other words, the cord 23 comprises a continuous elongate loop). Here, the ends of lanyard are threaded through eyelets or otherwise coupled to the retardation device 22 and payload 16.

In some embodiments, the retardation device 22 comprises a drogue with a high drag coefficient. In a first mode, the retardation device 22 is stored within the housing 21 of the payload activation device 20. In a second mode, the retardation device 22 is released into the airflow outside of the payload 16 in order to pull the cord 23 out of the housing 21. The retardation device 22, having a higher drag coefficient than the payload 16, decelerates relative to the payload 16. The retardation device 22 slows one end of the cord 23 relative to the end coupled to the activation mechanism such that the cord 23 is tautened. In other embodiments, the retardation device 22 comprises one or more members configured to extend from a retained position, outside of the airflow, to a position within the airflow in order to pull the cord 23 out of the housing 21. For example, the one or more members, in one embodiment, are spring-loaded and configured to rotate about an axis substantially parallel to the direction of travel of the payload 16, when released by the retaining device 30, across an end surface of the housing 21 into the airflow.

In FIG. 2, the retaining device 30 is shown as a controllable door in the housing 21 of the payload activation device 20 through which the retardation device 22 can be released into the airflow. According to other embodiments, the retaining device 30 is a releasable catch for retaining the retardation device 22 within the housing 21, or for preventing the retardation device from expanding or otherwise operating to cause the cord 23 to tauten.

The retaining device 30 is operated to release the retardation device 22 a predetermined time after the payload 16 has been released from the aircraft 10. The retaining device 30 is operated by an activation delay device 28. The activation delay device 28 according to some embodiments is a timer embedded in the processor 26. The delay set by the activation delay device 28 may be selectable, either by the pilot during flight of the aircraft 10 or by maintenance crew when the payload 16 is being loaded onto the aircraft 10, in order to accommodate specific payload or platform release criteria.

In alternative embodiments, instead of a time, the delay may comprise a distance. For example, instead of comprising a timer, the activation delay device 28 comprises an altimeter programmed to release the retaining device 30 when the payload 16 reaches a predetermined altitude.

Figure 3A:
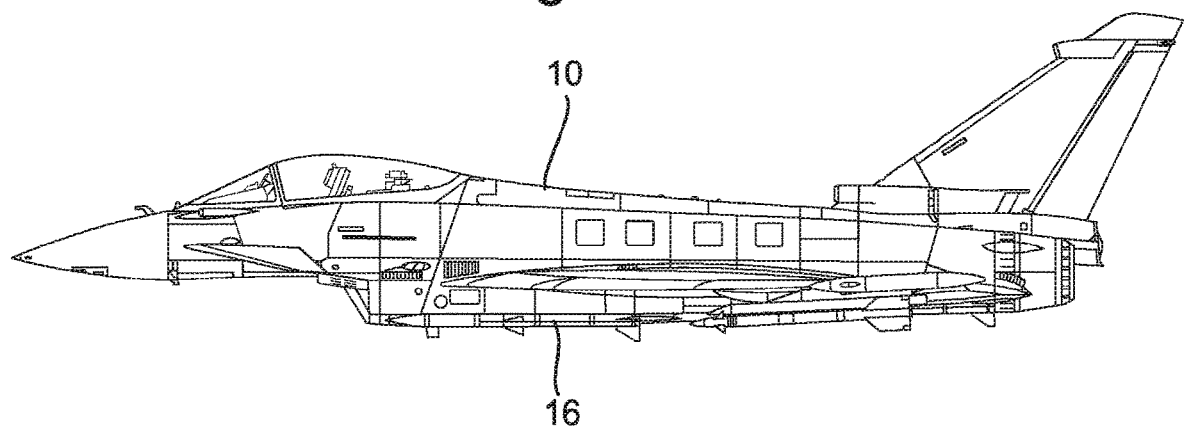
FIGS. 3*a*-*d* show a procedure for an aircraft releasing a payload according to embodiments of the present invention.

A process for activating the payload 16 will now be described with reference to FIGS. 3a through to 3d. The aircraft 10 shown in these Figures is a manned fighter aircraft 10 releasing a payload 16 from a fuselage shoulder hardpoint 14. The payload 16 is an air-to-air missile that is to be dropped from the aircraft 10 before having its motor ignited to drive it forwards. FIG. 3a shows the payload 16 coupled to the aircraft 10.

Figure 3B:
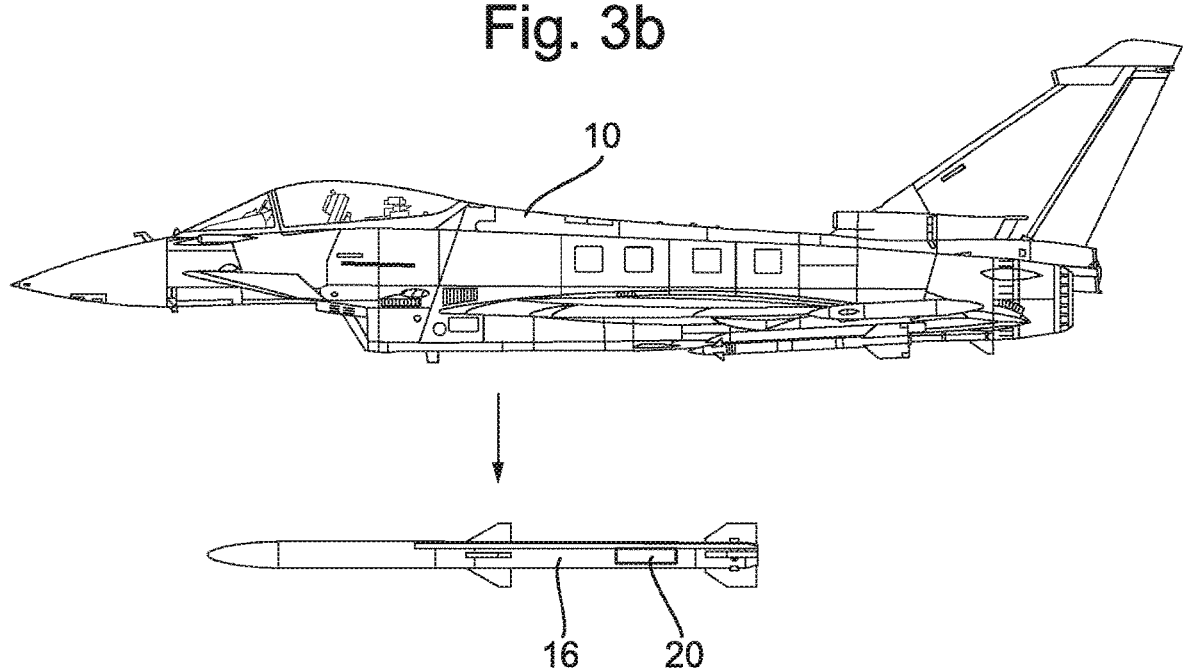

In a first step, the pilot locks the guidance system (e.g. radar seeker) of the payload 16 onto a target. When the aircraft's 10 computer indicates the aircraft 10 is within the launch acceptability region, the pilot releases the payload 16. This is shown in FIG. 3b.

Meanwhile, the fixed focal length camera 24 captures images of the object on the shoulder hardpoint 14. The images are captured at intervals of a fraction of a second. The processor 26 processes these images to determine whether the object in the image is in focus or out of focus. As at this stage the payload 16 is still attached to the hardpoint 14, the object in the image is determined to be in focus.

Upon release from the aircraft 10, the payload 16 moves away from the aircraft 10 under gravity. As the camera 24 is of a fixed focal length, the images of the object immediately begin to lose focus. Once the images are substantially out of focus, for example when lines of the object are no longer distinguishable from each other, the processor 26 transmits a signal to the activation delay device 28 so that the activation delay device 28 can begin the predetermined delay period. This tends to prevent the retardation device 22 from being released the moment the payload 16 is dropped, which could result in the retardation device 22 getting caught on, or affected by, the aircraft 10.

Figure 3C:
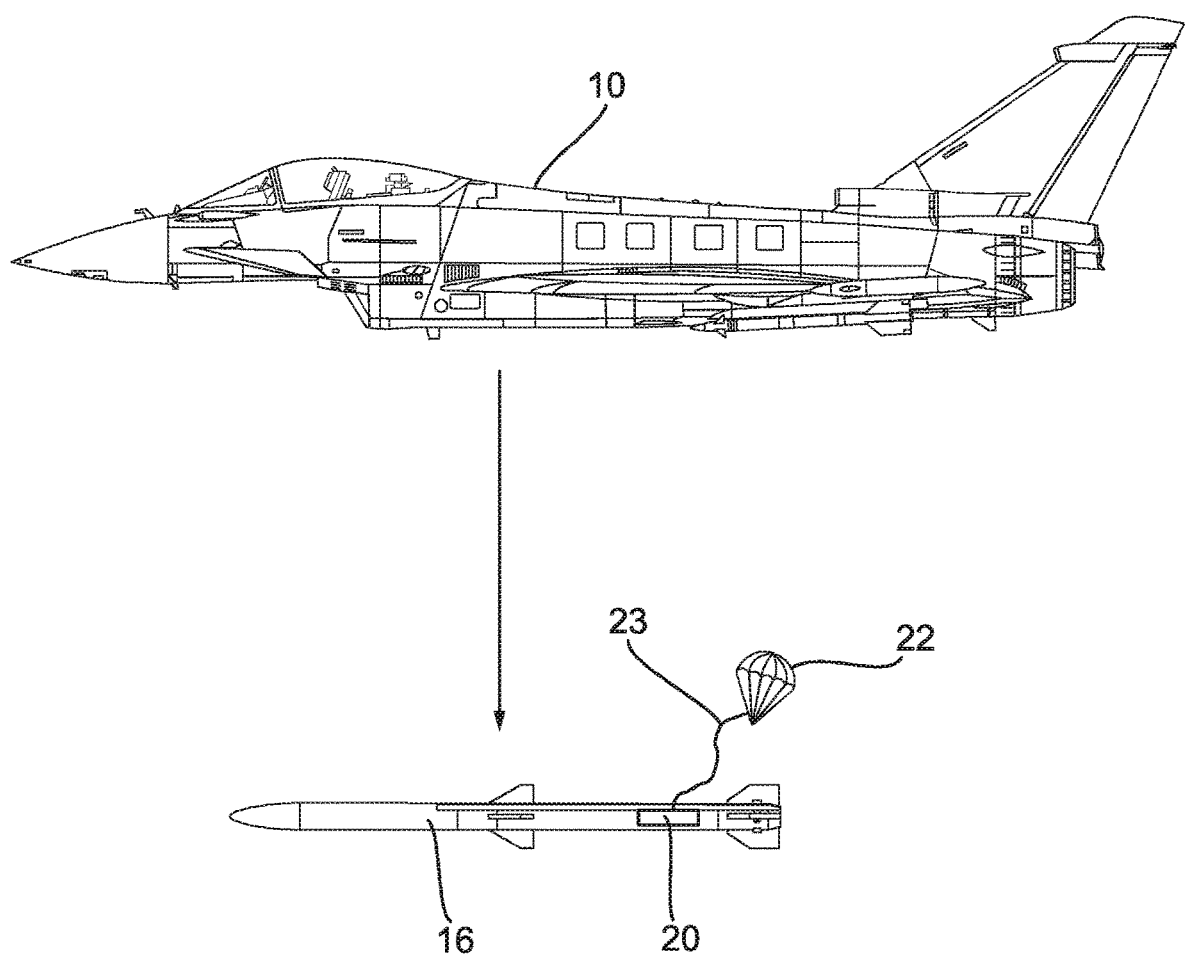

As shown in FIG. 3c, immediately after the predetermined delay period, the processor 26 transmits a signal to the retaining device 30 to release the retardation device 22.

The retardation device 22, due to its relatively high drag coefficient, moves through the air slower than the payload 16. Therefore, the retardation device 22 pulls the cord 23 out of the housing 21. In other words, the retardation device 22 extrudes the cord 23.

When the tension across the cord's 23 length reaches a predetermined threshold, an activation mechanism coupled to one of the cord's 23 ends is actuated in order to activate the payload 16. Activating the payload 16 may include deactivating a SAFU, activating a motor, or causing flight controls to extend from a housed position.

Figure 3D:
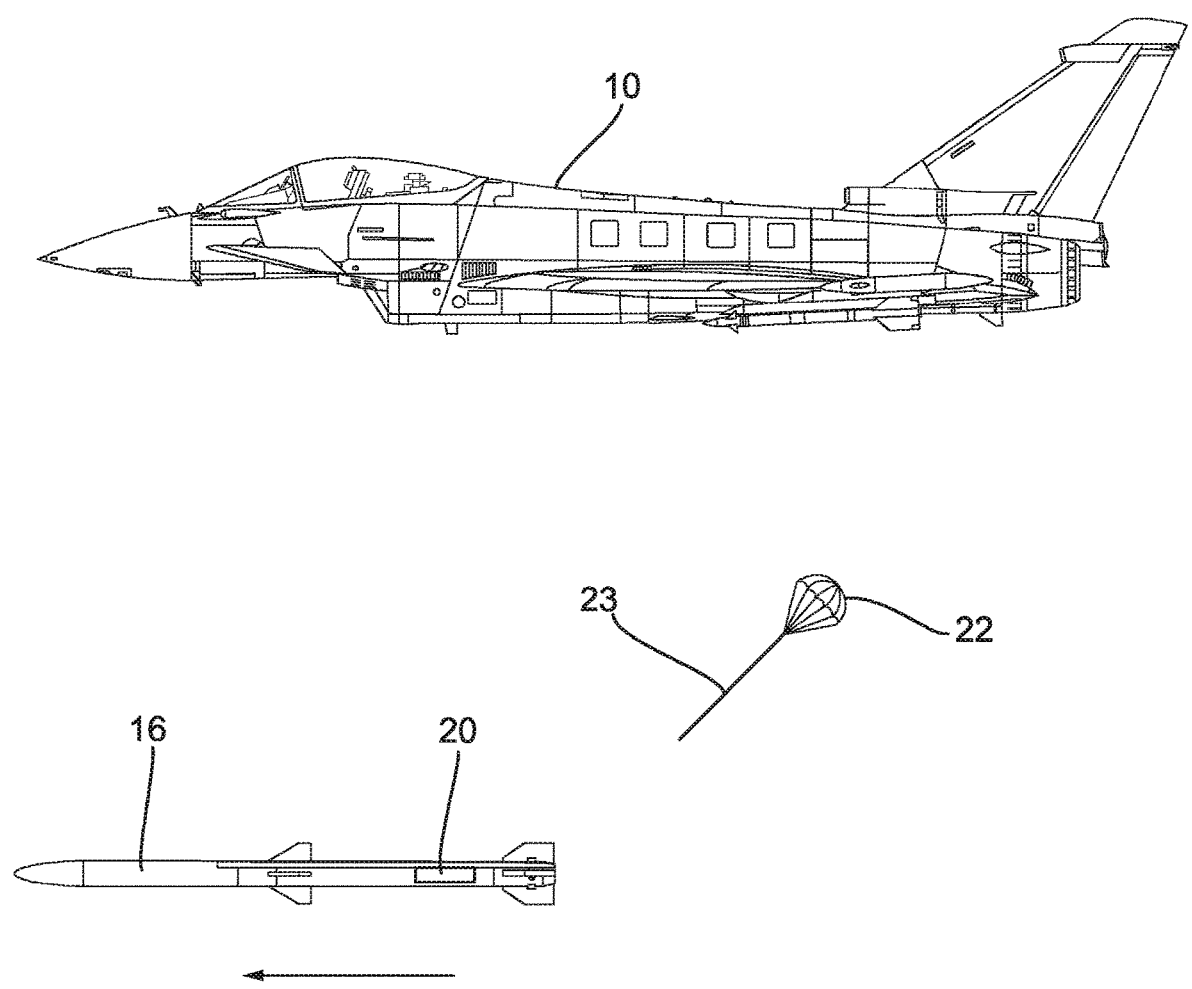

As shown in FIG. 3d, at a second predetermined tension, the cord 23 breaks away from the activation mechanism in the payload 16. To facilitate this, in some embodiments, the cord 23 snaps at a point along its length. In other embodiments, the lug or other means for attaching the cord 23 to the activation mechanism breaks or otherwise releases the cord 23 at the second predetermined tension. In other words, in some embodiments, the lug is frangible.

It would be readily understood by the skilled person that the steps of locking onto a target and computing a launch acceptability region are not necessary where the payload 16 is not a weapon, or where a weapon is to be disposed of without arming or attacking a target. In the latter case, the pilot of the aircraft 10 sets the delay of the activation delay device 28 to a period of time greater than the time it would take for the payload 16 to reach the ground. Alternatively, where the pilot does not want the payload 16 to activate before it reaches the ground, the pilot may opt to release the payload 16 such that the activation delay device 28 will not activate, such as by inhibiting the fixed focal length camera 24.

Therefore, according to the present invention, no part of the cord 23 is retained on the aircraft 10. Therefore, a potential hazard whereby a retained part of the cord 23 could snag on an adjacent structure or payload 16 tends to be avoided.

According to other embodiments, the payload activation device 20 comprises a servo-driven actuator is electrically coupled to the processor 26. The servo-driven actuator (otherwise referred to as a servo) is mechanically coupled to the activation mechanism of the payload 16. When the payload 16 is a safe distance from the aircraft 10 (in other words, when the payload 16 has fallen a predetermined distance or for a predetermined amount of time), the servo is operated to actuate the activation mechanism and activate the payload 16.

The solution provided by the present invention not only provides an advantage in that it can be retrofitted with little modification to payloads already in existence, but it provides a solution to the problem of floating lanyards that involves little in the way of complexity or extra weight.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A payload activation device, the payload activation device comprising:
a camera having a fixed focal length, the camera being arranged to capture an image of an object on a platform for carrying a payload having the payload activation device, wherein, when the payload is in a first position relative to the platform, the image of the object is in a first focused state and, when the payload is in a second position relative to the platform, the image of the object is in a second focused state; and a processor configured to determine whether the image of the object is in the first focused state or the second focused state and to cause actuation of an activation mechanism within the payload, when the image of object is in the second focused state, to activate the payload.

2. The payload activation device according to claim 1, further comprising a servo for actuating the activation mechanism, the processor being configured to cause actuation of the servo to actuate the activation mechanism when the image of the object is in the second focused state.

3. The payload activation device according to claim 2, the payload activation device further comprising an activation delay device configured to cause actuation of the activation mechanism a predetermined time after the image of the object enters the second focused state.

4. The payload activation device according to claim 2, wherein, in the first focused state, the object is in focus, and, in the second focused state, the object is substantially out of focus.

5. The payload activation device according to claim 1, the payload activation device further comprising:
a housing;
a cord, disposed within the housing, arranged to be coupled, at a first end, to an activation mechanism within a payload; and
a retardation device coupled to the second end of the cord, wherein the processor is configured to release the retardation device from a retained position within or adjacent to the housing when the image of the object is in the second focused state,
wherein, when released, the retardation device is arranged to tauten the cord, and
wherein, at a first tension, the cord is arranged to actuate the activation mechanism.

6. The payload activation device according to claim 5, wherein the retardation device comprises a drogue.

7. The payload activation device according to claim 6, the payload activation device further comprising an activation delay device configured to cause actuation of the activation mechanism a predetermined time after the image of the object enters the second focused state.

8. The payload activation device according to claim 5, the payload activation device further comprising an activation delay device configured to cause actuation of the activation mechanism a predetermined time after the image of the object enters the second focused state.

9. The payload activation device according to claim 5, wherein, in the first focused state, the object is in focus, and, in the second focused state, the object is substantially out of focus.

10. The payload activation device according to claim 1, further comprising:
an activation delay device configured to cause actuation of the activation mechanism a predetermined time after the image of the object enters the second focused state.

11. The payload activation device according to claim 10, the payload activation device further comprising:
a housing;
a cord, disposed within the housing, arranged to be coupled at a first end to an activation mechanism within a payload; and
a retardation device coupled to the second end of the cord, wherein the processor is configured to release the retardation device from a retained position within or adjacent to the housing when the image of the object is in the second focused state,
wherein, when released, the retardation device is arranged to tauten the cord, and wherein, at a first tension, the cord is arranged to actuate the activation mechanism, and
wherein the activation delay device is configured to release the retardation device by opening a door in the housing of the payload activation device.

12. The payload activation device according to claim 1, wherein, in the first focused state, the object is in focus, and, in the second focused state, the object is substantially out of focus.

13. The payload activation device according to claim 12, wherein the object comprises a plurality of spaced apart lines, and wherein, in the first focused state, individual lines are distinguishable by the processor and, in the second focused state, individual lines are not distinguishable by the processor.

14. A deployable payload for an aircraft, the deployable payload comprising:
a payload activation device comprising:
a camera having a fixed focal length, the camera being arranged to capture an image of an object on a platform for carrying a payload having the payload activation device, wherein, when the payload is in a first position relative to the platform, the image of the object is in a first focused state and, when the payload is in a second position relative to the platform, the image of the object is in a second focused state; and
a processor configured to determine whether the image of the object is in the first focused state or the second focused state and to cause actuation of an activation mechanism within the payload, when the image of object is in the second focused state, to activate the payload,
the deployable payload comprising an activation mechanism for activating the payload,
wherein the activation mechanism is arranged to be actuated to activate the payload when the image of the object is in the second focused state.

15. The deployable payload according to claim 14, wherein the activation mechanism is configured to release the cord when the cord is at a second predetermined tension between the first end and second end, the second tension being greater than the first tension.

16. The deployable payload according to claim 14, wherein the cord is configured to break when the cord is at a second predetermined tension between the first end and second end, the second tension being greater than the first tension.

17. The deployable payload according to claim 14, wherein the payload activation device is coupled to the outside of the payload.

18. The deployable payload according to claim 14, further comprising an engine, wherein the activation mechanism is arranged to activate the engine when actuated.

19. The deployable payload according to claim 14, further comprising a safety, arming, and fusing unit configured to prevent a warhead from being armed, wherein the activation mechanism is configured to deactivate the safety, arming, and fusing unit when actuated.

20. An aircraft for carrying the deployable payload according to claim 14, the aircraft comprising a plurality of spaced apart lines, wherein the camera is arranged to capture an image of the spaced apart lines when the deployable payload is carried.

* * * * *